United States Patent

Krostewitz

[15] 3,665,755
[45] May 30, 1972

[54] METHOD FOR MEASURING RATE OF FLUID ABSORPTION OF PLASTER MOLDS

[72] Inventor: Wolfgang Krostewitz, Somerville, N.J.
[73] Assignee: American Standard Inc., New York, N.Y.
[22] Filed: May 28, 1970
[21] Appl. No.: 41,435

[52] U.S. Cl....................................................73/73, 73/204
[51] Int. Cl.................................................................G01f 1/00
[58] Field of Search.................................................73/204, 73

[56] References Cited

UNITED STATES PATENTS

| | | | |
|---|---|---|---|
| 2,859,617 | 11/1958 | Adams | 73/204 |
| 3,216,249 | 11/1965 | Joel | 73/204 |
| 3,085,431 | 4/1963 | Yerman et al. | 73/204 |
| 2,947,938 | 8/1960 | Bennett | 73/204 X |

Primary Examiner—Jerry W. Myracle
Attorney—Sheldon H. Parker, Tennes I. Erstad and Robert G. Crooks

[57] ABSTRACT

A solid state device for measuring the water absorption ability of a plaster mold includes a water reservoir, a capillary member and a pair of thermistors, one of which is designed to measure temperature changes in response to water flow in the capillary member during the measuring process.

10 Claims, 2 Drawing Figures

Patented May 30, 1972

3,665,755

INVENTOR.
Wolfgang Krostewitz
BY Sheldon H Parker
ATTORNEY

METHOD FOR MEASURING RATE OF FLUID ABSORPTION OF PLASTER MOLDS

BACKGROUND OF THE INVENTION

1. Field of the Invention

This invention relates to a device for measuring the water absorption rate of plaster molds. More particularly, the present invention relates to a device for measuring the rate of absorption of water by plaster molds from a clay suspension in water.

2. Description of the Prior Art

In the fabrication of large thin-walled objects such as crucibles, retorts and sanitary ware as well as in the manufacture of fine earthenware, porcelain and the like, it has been common for many years to employ slipcasting. Briefly, this technique involves pouring a suspension of suitable composition and concentration into a preshaped plaster mold, the highly porous nature of which removes water from the slip by capillary action. As water is continuously removed from the slip, the slip becomes locally concentrated at the slip-mold interface, forming a solidified clay layer at the surface of the plaster mold. Growth of the solidified region is permitted to continue by this process until such time as the desired thickness is attained. This end may be reached either by stopping the process by draining off excess liquid, or alternatively, by adding additional slip to compensate for the water removed until such time as the total area within the mold is filled with a solid concentrate. The former and more popular process is termed drain casting and the latter solid casting.

Although the slip casting process is, indeed, a simple technique requiring little skill, numerous difficulties are encountered in the control fo the rate and uniformity of skin growth. Unfortunately, the sedimentation volume and the solid concentration of the skin are subject to considerable variation, such being attributed in large measure to the rate of removal of water from the suspension. Accordingly, workers in the art have long sought in vain to devise a technique or apparatus capable of predetermining the water absorption rate of a plaster mold, thereby providing a ready means for predicting the suitability of a particular mold for the intended purpose.

SUMMARY OF THE INVENTION

In accordance with the present invention, these desiderata are met by a novel device which is capable of measuring the rate of absorption of water by a plaster mold. Briefly, the subject device includes a container having disposed therein a measuring thermistor and a reference thermistor, a reservoir of water and a capillary member through which water flows during the measuring process from the water reservoir into the plaster mold. Appropriate circuitry is provided to permit heating of the thermistors. When the device is operated as described herein, the temperature changes in the measuring thermistor caused by the flow of water passing on its way to the mold are detected and, by means of suitable calibration techniques, are correlated to the rate of water being absorbed by the mold.

BRIEF DESCRIPTION OF THE DRAWINGS

The invention will be more readily understood by reference to the following detailed description taken in conjunction with the accompanying drawings wherein.

DETAILED DESCRIPTION OF THE INVENTION

Figure 1:
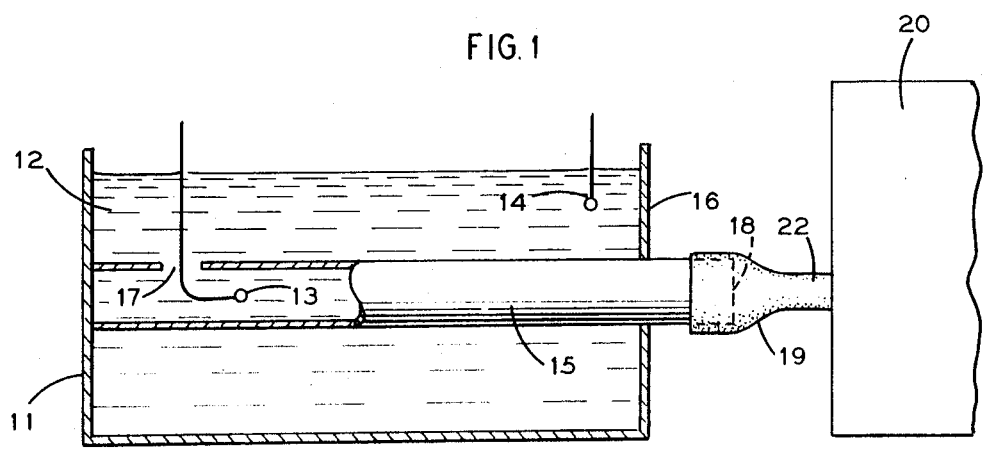
FIG. 1 is a schematic representation of the device of the invention.

With reference now more particularly to FIG. 1, there is shown a container 11 having disposed therein a water reservoir 12, a measuring thermistor 13, a reference thermistor 14, and a conduit or capillary member 15 which emerges from the container 11 through a side wall 16. Capillary 15 has an inlet 17 and an outlet 18 (maintained outside the container) upon which is affixed a hose member 19 which is designed to avoid leakage between the capillary and the mold of interest 20. Measuring thermistor 13 is physically located in a region of flow, that is, an area wherein a representative rate of flow can be perceived. Accordingly, it is desirable to situate thermistor 13 in the capillary 15, at inlet 17, or in the region immediately surrounding the inlet. Reference thermistor 14 is located in water reservoir 12 in a region of general quiescence, that is a region in which there is no perceptible flow of water during the absorption process.

Figure 2:
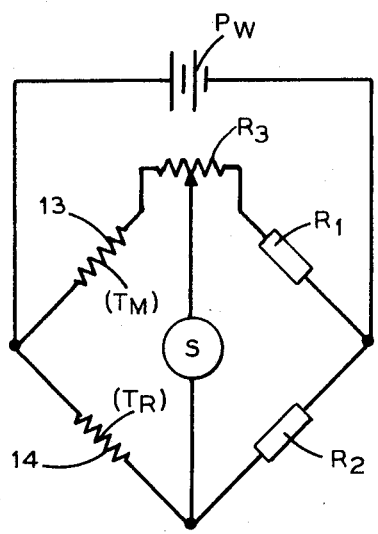
FIG. 2 is a circuit diagram of the apparatus described.

The device of interest is completed by means of the necessary circuitry and power supply shown in FIG. 2. FIG. 2 shows the circuit of interest wherein measuring thermistor 13 ($T_M$) and reference thermistor 14 ($T_R$) are each positioned as one leg of a conventional Wheatstone bridge, $R_1$ and $R_2$ being the remaining resistors in the bridge. The bridge is supplied with power by means of power source $P_u$, preferably a direct current power source. The circuit also includes a measuring means S for measuring the partial difference over S which is proportional to the rate of flow of water through the capillary and into the mold.

The Wheatstone bridge utilized in the subject device, as noted above, include a pair of thermistors $T_M$ and $T_R$ and a pair of resistors $R_1$ and $R_2$. Ideally, it is desirable that the resistance value of $T_M$ and $T_R$ be of the same magnitude. Similarly, in the interest of enhanced sensitivity, it is desirable that $R_1$ and $R_2$ be of the same magnitude as the thermistors, the remaining resistor being a variable resistance which is capable of being adjusted for zero signal output at zero water flow.

In the operation of the device, the power is initially turned on and under the influence of the applied power the thermistors are heated up to an equilibrium temperature. During this period, the signal output from the bridge is zero since both thermistors are heating at equal rates, that is, the heat exchange of both $T_M$ and $T_R$ is equal, slight deviations having been cancelled by the variable resistor $R_3$.

The measuring process is then initiated by contacting hose member 19 with a suitable plaster of Paris mold, such as 20, whose rate of water absorption it is desired to measure. Upon contact, the absorptive forces of the mold immediately begin to withdraw water from the capillary. The water maintained in the water reservoir 12 remains stagnant for all practical purposes except in the so-called region of flow surrounding inlet 17 wherein water is admitted to the capillary to replace that volume of water removed by the mold. Accordingly, the heat exchange of measuring thermistor 13, $T_M$, will begin to change and, consequently, its temperature will change. However, the temperature of reference thermistor 14 remains stable in the area of relative stagnation in water reservoir 12. Thus, an imbalance is created in the Wheatstone bridge as indicated by a signal output from S (in FIG. 2).

Calibration of the device may be effected by creating a known flow of water in the capillary by any well-known procedure, as for example, by injecting an air bubble into the capillary, and measuring the signal output, and the time it takes for the air bubble to traverse a given distance.

The air bubble is used as a marker, so that a point in the water stream can be identified. Alternatively, an immiscible dye could be injected into the water stream so as to permit the velocity of the water to be measured.

The capillary tube is calibrated in any convenient manner, as for example, by the conventional technique of weighing the amount of water between two markers in the capillary tube.

The flow rate is varied so that a required range of calibration of signal output vs. flow rate can be obtained. The flow rate can be varied by any convenient technique, such as, changing the height of the supply reservoir of the water or by using a variable speed water supply pump.

Alternatively, calibration can be carried out by weighing the amount of water which flows through the capillary tube in a unit of time. Signal output vs. flow rate can thus be calibrated for a variety of flow rates.

It should also be understood that the term "capillary member" is a term of convenience and is not intended to be given a narrow technical interpretation.

The tube diameter is essentially determined by the size (cross-sectional area) of the tip 22 of the hose member 19. The greater the surface area provided for the absorption of the fluid, by the porous body the greater can be the diameter of the capillary tube. The linearity of the flow rate vs. the water absorption rate is improved by using larger diameter capillary tubes.

As an exemplary embodiment of the subject device follows:

A rectangular glass container, 1½ × 2 × 2½ inches having a capillary member of one-fourth inch inside diameter (I.D.), (including an inlet and an outlet) disposed therein and emerging from a side wall was employed. The container was filled with 0.117 liters of water. Next, a measuring thermistor $T_M$ was inserted in the water adjacent to the inlet of the capillary and a reference thermistor $T_R$ inserted in the water near the far end of the capillary. Both $T_M$ and $T_R$ manifested a resistance of 10 kilohms. Thereafter, $T_M$ and $T_R$ were connected as legs of a Wheatstone bridge having a pair of resistors $R_1$ and $R_2$, each of 10 kilohms resistance and a power source $P_{11}$ comprising a dry cell battery of 12 volts was also connected to the bridge. Next, the apparatus so constructed was contacted with a typical plaster of Paris mold by means of a hose member affixed to the outlet of the capillary and water flow initiated. (In the device described, calibration was effected prior to measurement). Based upon the prior calibration, water flow for the mold described was found to be approximately 100 microliters per second per 30 square millimeters.

It will be appreciated by those skilled in the art that the above device may be varied without departing from the spirit and scope of the invention as, for example, by varying the value of the thermistors or resistors in the bridge, the power source, etc. Additionally, it may be considered desirable to employ an additional water reservoir to continuously replenish water removed from the capillary and main water reservoir by the mold. Further, the fluid can be a gas as well as any liquid such water. Thus, while the system has particular applicability and utility in connection with testing the condition of a plaster mold, it can also be applied to analyzing gas flow from porous bodies other than plaster molds.

It should also be noted that, the tube diameter is essentially related to the size of the tip 22. The greater the surface area provided for absorption the larger can be the tube diameter. This is not critical, however, but rather affects linearity. Obviously, it is more expedient to employ a linear system, but in any event, a complete calibration can be obtained.

For convenience the term capillary tube is employed, but it should be understood that the tube diameter can exceed the maximum diameter for a capillary tube, which for water is approximately one-sixteenth of an inch.

What is claimed is:

1. A method of measuring the water absorption rate of a plaster mold comprising,
    a. providing fluid communication between a fluid reservoir and a surface of said plaster mold;
    b. measuring the fluid flow rate between the fluid reservoir and said surface of said plaster mold;
    c. wherein said fluid flow rate is directly related to the water absorption rate of said plaster.

2. The method of claim 1 wherein said step of measuring the fluid flow rate between the fluid reservoir and said surface of said plaster comprising measuring the change in resistance of a measuring thermistor position in said fluid.

3. A method in accordance with claim 2 wherein said measuring thermistor is situated proximate said mold surface.

4. A method in accordance with claim 2 wherein said measuring thermistor is situated in said fluid reservoir.

5. A method in accordance with claim 2, further comprising, heating said measuring thermistor and a reference thermistor.

6. The method of claim 1 wherein the aforesaid fluid communication takes the form of a flow duct having a flow area substantially less than that of the reservoir, whereby the linear flow rate in the duct is substantially greater than the linear flow rate in the reservoir.

7. The method of claim 6 wherein measuring step (b) comprises electrically comparing the electrical resistances offered by a first thermistor disposed in the flow duct and a second thermistor disposed in the reservoir.

8. A method of measuring the fluid-absorption capability of a porous plaster mold body comprising the steps of connecting the porous plaster body to a fluid source having negligible pressure head, and measuring the rate of fluid flow from the source into the body due to capillary action.

9. The method of claim 8 wherein the fluid source comprises a liquid reservoir elevated only a few inches above the connection to the fluid body, whereby only a small pressure head is established in the reservoir.

10. The method of claim 9 wherein the fluid connection between the reservoir and the porous body has a flow area substantially less than that of the reservoir, whereby the linear flow rate in the fluid connection is substantially greater than the linear flow rate in the reservoir; flow rate measuring step comprising the substep of comparing the electrical resistances offered by a first thermistor disposed in the fluid connection and a second thermistor disposed in the reservoir.

* * * * *